United States Patent
Fleming

(10) Patent No.: US 6,814,527 B1
(45) Date of Patent: Nov. 9, 2004

(54) DEBRIS COLLECTION SYSTEM FOR USE WITH HOLE CUTTING DEVICES

(76) Inventor: Merrion Fleming, 3316 W. Carson St. Suite 12, Carson, CA (US) 90503

( * ) Notice: Subject to any disclaimer, the term of this patent is extended or adjusted under 35 U.S.C. 154(b) by 0 days.

(21) Appl. No.: 10/376,700

(22) Filed: Feb. 28, 2003

(51) Int. Cl.[7] .............................................. B23B 47/34
(52) U.S. Cl. ......................... 408/67; 408/112; 175/211
(58) Field of Search ............................. 408/67, 95, 112, 408/204, 206; 175/211, 308, 311

(56) References Cited

U.S. PATENT DOCUMENTS

| | | | | |
|---|---|---|---|---|
| 2,716,019 A | * | 8/1955 | Shacikoski | 175/211 |
| 2,792,199 A | * | 5/1957 | Becker et al. | 175/211 |
| 2,828,108 A | * | 3/1958 | Hood et al. | 175/211 |
| 6,120,220 A | * | 9/2000 | Speare | 408/1 R |
| 6,457,915 B1 | * | 10/2002 | Kao | 408/67 |

FOREIGN PATENT DOCUMENTS

| | | | | |
|---|---|---|---|---|
| GB | 2096030 | * | 10/1982 | B23B/47/34 |
| JP | 10-225811 | * | 8/1998 | B23B/47/34 |
| JP | 2000-317709 | * | 11/2000 | B23B/47/34 |
| JP | 2000-334636 | * | 12/2000 | B23B/47/34 |

* cited by examiner

*Primary Examiner*—Daniel W. Howell
(74) *Attorney, Agent, or Firm*—Goldstein Law Office, P.C.

(57) ABSTRACT

A debris collecting apparatus for use with ceiling cutting equipment for collecting debris resulting from the cutting of an opening in a ceiling. The debris collecting apparatus comprises a collection basket having an open upper end and a seal thereat for engaging the ceiling. A cutting blade extends through the basket and is oriented toward the open upper end. A position adjusting mechanism allows relative vertical position of the cutting blade and cutting basket to vary such that the collection basket to remain positioned against the ceiling as the cutting blade penetrates through the ceiling to ensure the collection of all debris, and allows the collection basket to remain stationary as the cutting blade rotates axially therethrough.

5 Claims, 5 Drawing Sheets

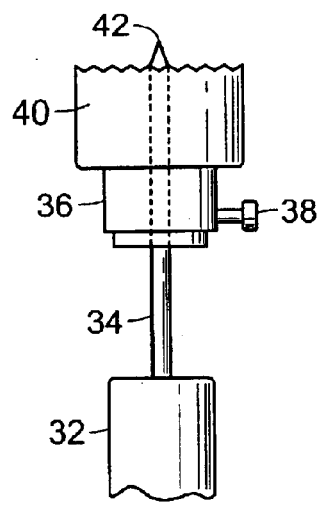
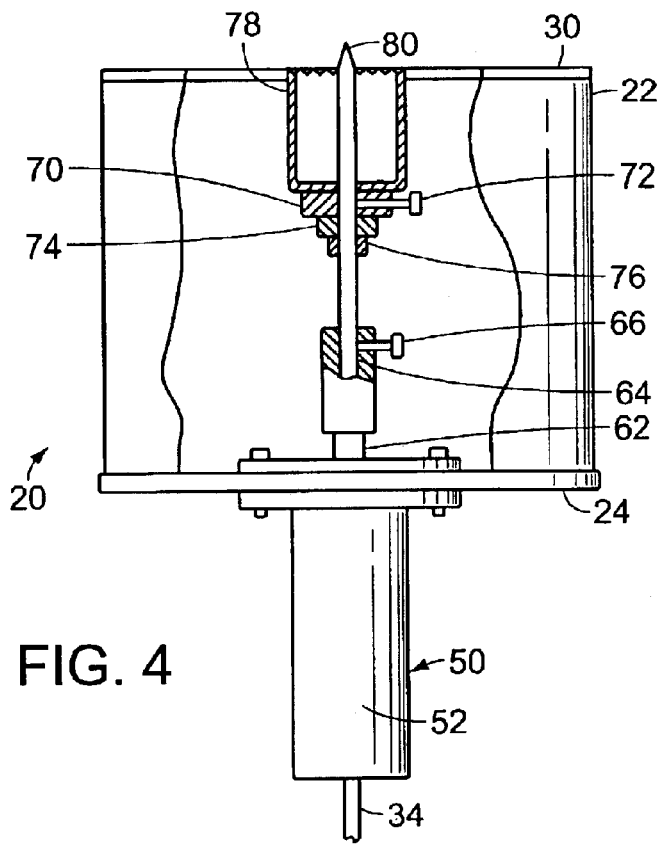
FIG. 3    FIG. 4
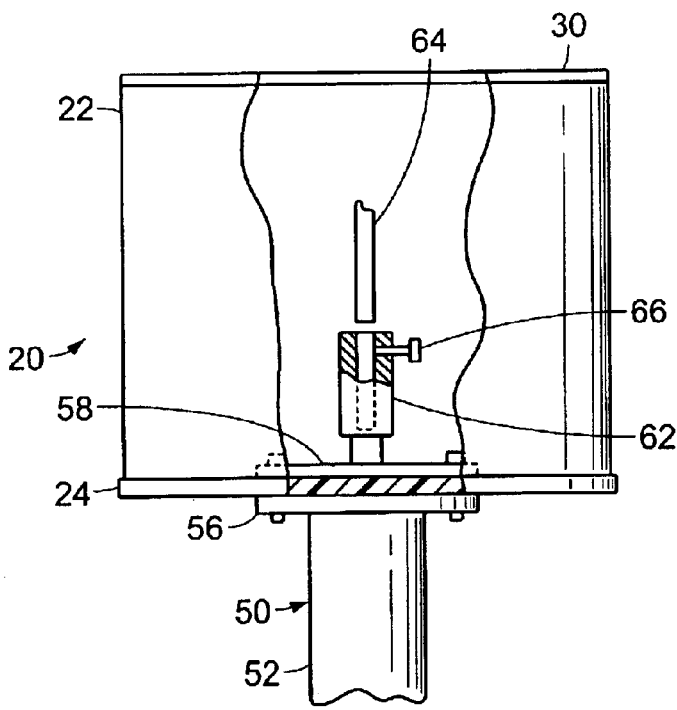
FIG. 5

DEBRIS COLLECTION SYSTEM FOR USE WITH HOLE CUTTING DEVICES

BACKGROUND OF THE INVENTION

The invention relates to a debris collecting apparatus for use with ceiling cutting equipment for collecting debris removed from the ceiling during a cutting operation.

Ceiling cutting device are frequently used by electricians and others tradesman for cutting an opening in a ceiling of a building structure. Devices of this type are often times referred to as "hole saws", "hole cutters" and "round hole cutters". Container lights, also known as "Hi-Hat" or "can lights" are frequently mounted within these openings formed in a ceiling. In many cases, these lights are referred simply to as recessed light fixtures. In recent years the modern look of these so called recessed lights has become so popular and many business organizations and owners of dwelling structures are removing existing conventional lighting devices and installing these recessed lights.

In order to install the recessed light device, in an existing sheet-rocked ceiling, it is necessary to form this enlarged opening in the ceiling for receiving the recessed light fixture. In many cases however, the area beneath the ceiling in which the recessed lights are to be installed may contain furniture and other equipment and appliances. Unless all of such furniture and equipment is removed, debris from the ceiling cutting operation may fall upon and damage the furniture or otherwise fall into the cause malfunctions of, if not completely destroy other equipment or appliances in the region of the cutting. In addition, the abrasiveness of the dust from some sheetrock can scratch furniture as it is dusted.

In order to preclude the soiling of furniture or other equipment and even more importantly, the damaging of other furniture and other equipment it is usually necessary to first move the furniture or other equipment and appliances in order to avoid this potential soiling damage. The act of moving the furniture and other equipment certainly presents a risk of damaging equipment or furniture. This is particularly true in the cases of computer equipment in the area where ceiling cutting operations may be present.

In many cases and in order to avoid the potential damage resulting from moving, the electrician or the other personnel will attempt to cover the equipment with 'drop cloths'. However, even this covering operation can result in damage to the equipment and is not necessarily effective in precluding damage from large ceiling pieces which often fall as they are being removed.

In addition to the foregoing it may be appreciated that removal or moving of equipment, appliances, and furniture is not only time consuming but adds additional labor cost to an entire operation as well. Furthermore the attendant risk of damage to furniture and equipment necessarily increases the cost of the installation to the average user. As a result it would be desirable to avoid the necessity if moving or covering furniture or other equipment located beneath or in proximity to a region where a ceiling cutting operation may take place, while protecting such furniture and equipment from the cutting operation.

Heretofore there has not been any effective apparatus for collecting debris which result from the cutting of a hole in the ceiling or the removal of the material from that ceiling. Part of the problem in designing and constructing any such debris collecting apparatus lies in the fact that the position of the cutting blade operated by that equipment continuously penetrates the ceiling structure. Consequently, it is necessary to ensure that any shield other debris collecting member is capable of remaining in fixed engagement with the ceiling during an entire cutting operation.

While these units may be suitable for the particular purpose employed, or for general use, they would not be as suitable for the purposes of the present invention as disclosed hereafter.

SUMMARY OF THE INVENTION

It is an object of the invention to produce a debris collecting apparatus which is useful with ceiling cutting equipment and capable of collecting debris resulting from the cutting of a ceiling. In another aspect the present invention relates to an assembly capable of cutting an opening in a ceiling or removing material from the ceiling and also collecting all of the debris resulting from the cutting of an opening or removal of material from a ceiling. It is therefore one of the primary objects of the present invention to provide a debris collecting apparatus for use with ceiling cutting equipment and which allows for an almost complete collection of any debris removed from a ceiling during the cutting of material removing operation.

It is an additional object of the present invention to provide an assembly of ceiling cutting equipment having a debris collecting apparatus associated therewith for enabling the cutting of a ceiling and the efficient collecting of material removed from the ceiling. Accordingly, the present invention has a basket, which extends concentric with the cutting saw to collect debris which falls therearound.

It is another object of the present invention to provide a debris collecting apparatus if the type states which efficiently and constantly remains in contact with the ceiling structure during a cutting operation and which thereby ensue an optimum collection of any debris resulting from a cutting operation.

It is another object if the present invention to provide a debris collecting apparatus of the type which allows for shiftable movement of a debris collecting shield with respect to a ceiling structure as a cutting elements penetrate the ceiling structure. Accordingly, the invention has a shield or basket adapted for abutting engagement with a downwardly presented surface of a ceiling. The debris collecting apparatus also comprises means for facilitating and compensating the shiftable position of the ceiling cutting equipment as a cutting blade pierces the ceiling structure and which thereby allows the debris collecting shield to constantly remain in contact with the ceiling structure and thereby collects substantially all debris removed therefrom.

It is a further object of the present invention to provide a debris collecting apparatus of the type states which is capable of being used with a wide variety if different types and sizes of ceiling cutting equipment. Accordingly, the invention is adaptable for use with a wide variety of power cutting tools and hole cutting saws.

In more detail, the debris collecting apparatus of the invention comprises a debris collecting basket having a base wall located to receive a rotating shaft driven by ceiling cutting equipment and this base is operatively mounted with respect to the rotating shaft. An enclosing cylindrical side wall of the basket is mounted on this base wall and receives a cutting blade mounted with respect to and operable by the rotatable shaft. The cutting blade extends axially through the basket and out through an open upper end of the basket for piecing into the ceiling structure. The open upper end of the basket is engaged in a flush engagement with the ceiling to collect debris from the cutting operation. An upper peripheral edge seal of the enclosing side wall engages the ceiling surface and forms a chamber to receive the cutting blade which pierces the ceiling. The cutting blade is actually mounted in an arbor and the side wall of the debris collecting basket is adapted to extend above the arbor.

In this latter embodiment of the invention, the debris collecting apparatus comprises a compensating mechanism for shifting the enclosing shield upwardly into constant engagement with the ceiling structure as there is relative movement of the cutting equipment with respect to the debris collecting shield. In this case, the compensating mechanism which provides that compensation includes a collar holding a cylindrically shaped tube which holds a spring-like mechanism causing a spring biasing movement of the shield upwardly into fixed engagement with the ceiling structure, regardless of the potion of the ceiling cutting equipment. Thus, and in effect, there is a relative movement between the debris collecting shield and the compensating mechanism with respect to the position of the cutting blade and the ceiling cutting equipment.

In more specific detail, the position compensating mechanism comprises an outer tubular housing having a spring capable of bearing against guides located within the housing and one of theses guides bears against a shiftable bearing. The other of the guides bears against a collar flange on the underside of the shield. Moreover, a bearing is also provided at the other end of the tubular housing to allow the shaft to rotate and to also shift axially with respect thereto.

This invention possesses many other advantages and has other purposes, which will become more fully apparent from a consideration of the forms in which it may be embodied. A practical embodiment of the debris collecting apparatus, as well as the assembly of the debris collecting apparatus and the ceiling cutting equipment, is illustrated in the accompanying drawings and described in further detail in the following detailed description of the invention. To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

FIG. 3 is an enlarged fragmentary side elevation view, showing a portion of the debris collecting apparatus of the present invention and the mounting on ceiling cutting equipment, including a power tool.

FIG. 4 is an enlarged fragmentary side elevation view, partially in section, and taken through a portion of the debris collecting apparatus and showing the mounting arrangement of the debris collecting apparatus with respect to ceiling cutting equipment.

FIG. 5 is a side elevation view, partially in section, and showing the mounting of an arbor shaft to the debris collecting apparatus of the present invention.

DETAILED DESCRIPTION OF THE PREFERRED EMBODIMENTS

Figure 1:
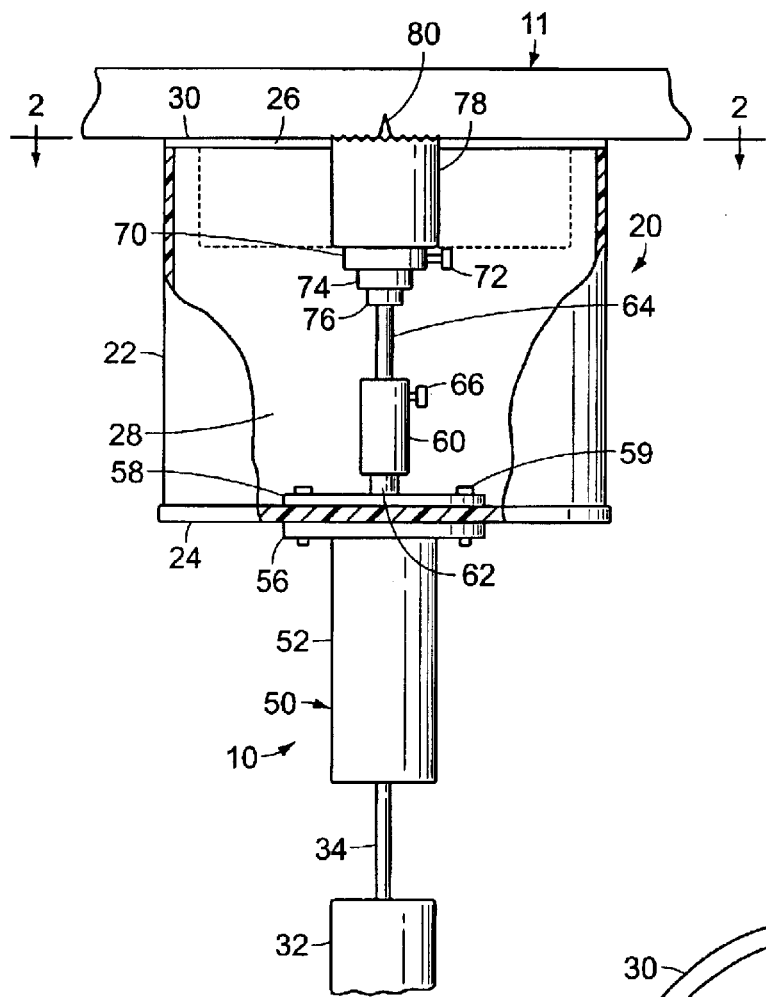
FIG. 1 is a side elevation view, partially broken away and in section and showing a debris collecting apparatus mounted on and with respect to ceiling cutting equipment, engaged with a ceiling structure to effect cutting thereof.
Figure 2:
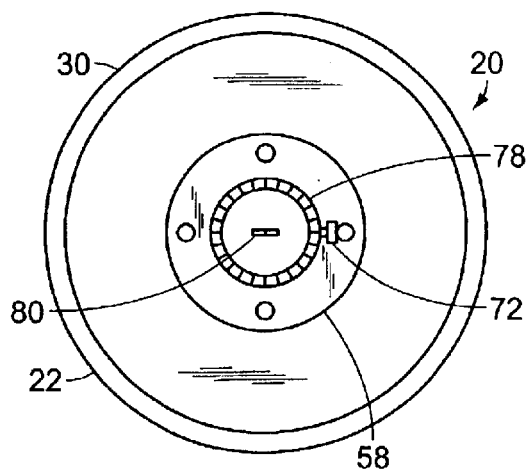
FIG. 2 is a top plan view of the debris collecting apparatus of FIG. 1 taken along line 2—2 of FIG. 1.

Referring now in more detail and by reference characters to the drawings, which illustrate practical embodiments of the present invention, "10" designates a debris collecting apparatus for use with ceiling cutting equipment or so-called hole cutters.

In this respect, the present invention also employs ceiling cutting equipment, e.g. hole cutters, hole saws, and the like, which have been provided with the debris collecting apparatus which has the capability of collecting any debris during a ceiling cutting operation. The ceiling cutting equipment normally includes a power driven member (tool) 32 somewhat in the nature of a hand drill, having a drive shaft 34, but having an actuating surface which is capable of cutting holes in a ceiling 11. In this respect, a hand held pistol grip or other type of hand receiving member is often provided on the housing if the devices and an arbor is mounted on the drive shaft extending from the motor of the hole cutter. Also in this respect and to the extent that the ceiling cutting equipment is conventional, description of such equipment in detail is unnecessary, and is beyond the scope of the present discussion.

The debris collecting apparatus generally comprises a basket 20 having a generally continuous side wall 22 and bottom wall 24 connected thereto. The basket 20 is provided with an open upper end 26 thereby forming an interior chamber 28 in which to receive any debris which is removed from the ceiling 11 during a cutting operation.

The basket 20 may be formed of any suiting material such as, for example, a lightweight plastic material, and preferably one which is easily molded, such as polystyrene, polyethylene, polypropylene, or the like. Furthermore, in some cases it is desirable to construct the basket 20 of transparent or at least translucent material so that one can monitor the amount of debris collected in the interior chamber 28 during any cutting operation, and even the progress of the hole cutting operation.

Mounted at the upper edge of the side wall 22 is a sealing ring 30 which is preferably formed of a suitable felt material or foam material such as a polyurethane foam. The sealing ring 30 will ensure a tight seal of the basket against the ceiling during a cutting operation and prevents the basket 20 from leaving a mark on the ceiling. The sealing ring effectively contains dust and particles within the basket 20. In the absence of such a sealing ring 30, small debris particles and dust which might otherwise enter a living space or working environment.

By further reference to FIGS. 1–4, a hole cutter with which the debris collecting apparatus is used comprises a motorized tool 32 having an outwardly extending drive shaft 34. In ceiling cutting operations. The tool 32 is vertically oriented so that the drive shaft 34 is vertically arranged for the ceiling cutting operations. The tool 32 is typically provided with a hand grip, often in the nature of a pistol grip, and an actuating trigger, which are not shown in detail herein inasmuch as the tool 32 itself is conventional.

The hole cuter with which the debris collecting apparatus of the present invention is used is more fully illustrated in FIG. 3 without the debris collecting apparatus. In this case, it can be seen that an arbor 36 is mounted on the drive shaft 34 and is secured thereto through a thumb screw 38. Secured to the upper end of the arbor 38 is a ceiling cutting blade 40. Also mounted in the upper end of the drive shaft 34 and extending outwardly therefrom is a piercing drill 42 or so called pilot drill which is concentric with the cutting blade 40. In this way, the piercing drill 42 will initially form a pilot hole in the ceiling at the desired center of the hole, and rotation of the cutting blade 40 will cause the circular blade to cut a circular hole in the ceiling having a diametrical size approximately equal to that of the cutting blade 40.

The debris collecting apparatus of the invention effectively utilizes the tool 32 and drive shaft 34 as well as the arbor 36, the cutting blade 40, and the piercing point 42. Thus, when so used, it forms an effective combination and essentially can be considered a new tool for cutting a hole in a ceiling. In other words, because of the ceiling cutting equipment, this combination in and of itself forms a new apparatus.

The debris collecting apparatus 10 of the invention also utilizes the basket 20 surrounding the cutting blade 40 and piercing point 42 to collect debris as the hole is cut in the ceiling. In this way, when the cutting blade 40 cuts a hole in the ceiling or otherwise removes material from the ceiling, any debris will collect within the basket.

It can be observed that as the piercing point 42 and the cutting blade 40 cut into the ceiling, they will progressively raise into the ceiling. Thus, a means to compensate for the position of the basket relative to the cutting blade 40 and the piercing point 42 must be provided. The debris collecting apparatus 10 of the invention provides a position compensating mechanism 50.

Figure 6:
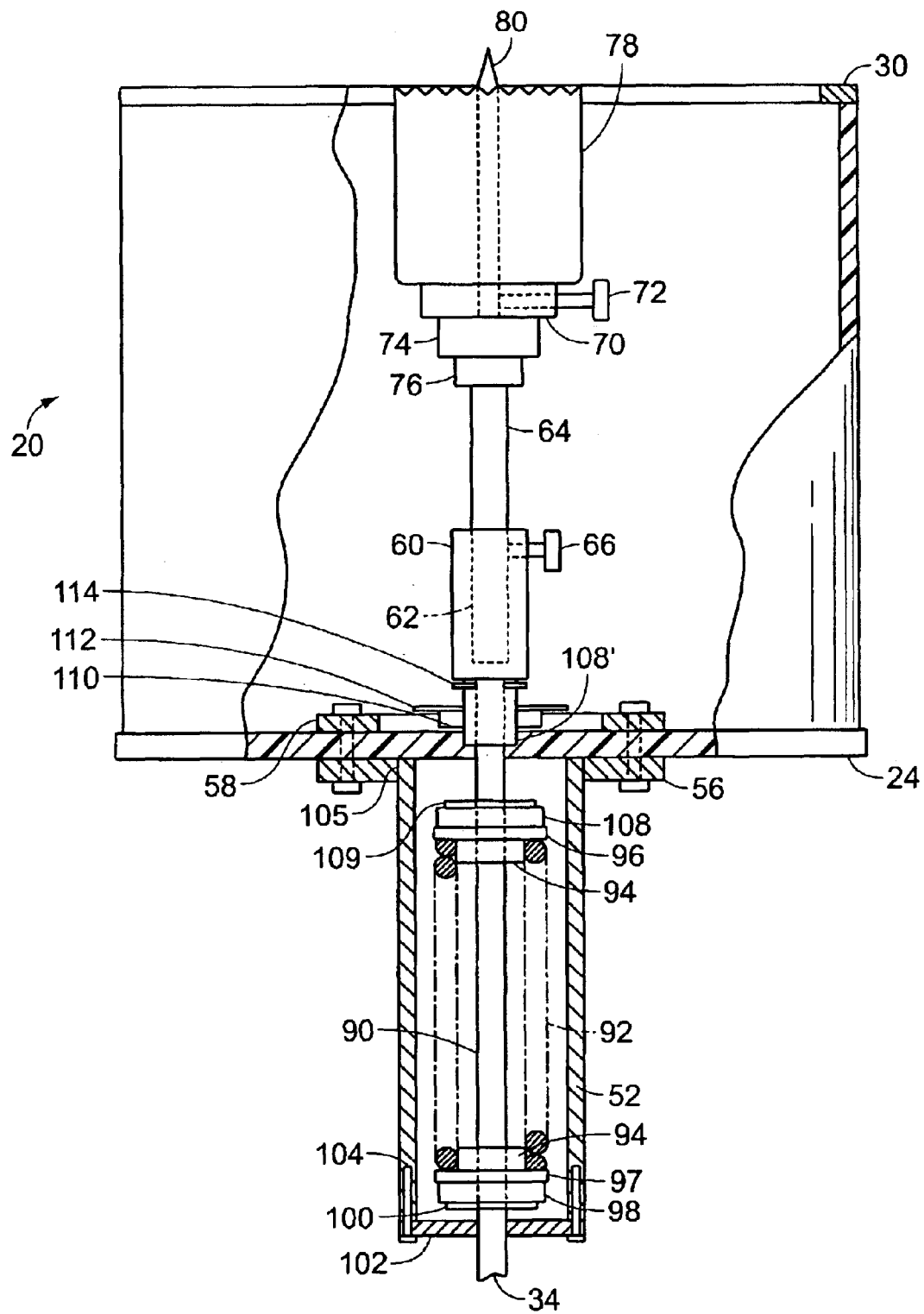
FIG. 6 is a fragmentary side elevation view, partially in section and showing a portion of the position compensating mechanism forming part of the debris collecting apparatus of the present invention.
Figure 7:
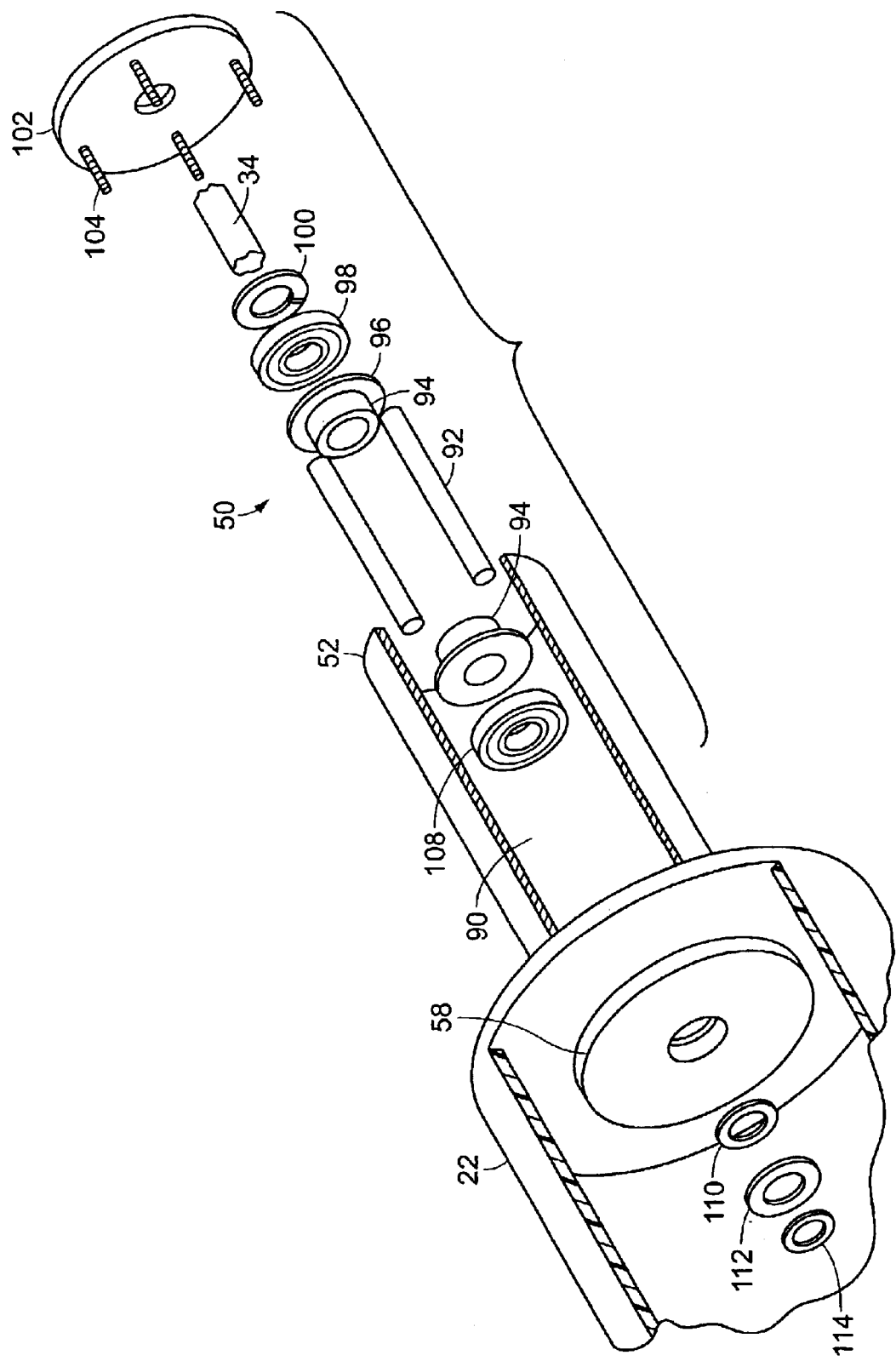
FIG. 7 is an exploded perspective view showing some of the major components of the position compensating mechanism forming part of the debris collecting apparatus of the present invention.

The position compensating mechanism 50 includes a compensator housing 52 which is mounted on and receives the drive shaft 34 substantially as shown in FIGS. 1, 4 and 6 of the drawings. The housing 52 is effectively clamped to the underside of the basket 20 by means of a pair of mounting plates 56 and 58, as best shown in FIGS. 1, 4 and 7 of the drawings. In this case, one of said mounting plates 58 is located on the upper surface of the bottom wall 24 of the basket and one of said mounting plates 56 is mounted immediately below. The two mounting plates 56 and 58 are thereupon secured together by means of bolts 59 which extend through the mounting plates and the basket bottom wall 24. The actual details of construction of the position compensating mechanism 50 are hereinafter described in more detail.

By initial reference to FIG. 6, however, it will be observed and hereinafter described that the drive shaft 34 does not effectively cause rotation of the position compensating mechanism 50 and, moreover, the basket 20 is not rotated inasmuch as the mounting plates 56 and 58 are not rotatable. In effect, the drive shaft 34 is journaled in the housing 52 and the plates 56 and 58, as hereinafter described in more detail. The drive shaft 34 is provided with coupling 60 at its upper end having a recess 62 to receive the lower end of a blade shaft 64 forming part of a cutting blade. This blade shaft 64 is releasably retained with the fitting 60 by means of a thumb screw 66. The coupling 60 may be secured to the outer end of the drive shaft 34 as it passes through and beyond the mounting or clamping plates 56 and 58, by any suitable means as, for example, be means of another thumb screw, if desired.

The cutting blade shaft 64 is secure to and causes rotation of an arbor, such as an arbor 70 similar to the previously described arbor 36. The arbor is secured to the cutting blade shaft 64 by means of thumb screw 72. Moreover, a washer 74 and locking nut assembly 76 may be mounted on the underside of the arbor 70. A cutting blade 78 is thereupon secured to the upper end of the arbor 70. Finally, a pilot drill 80 is also secured to or otherwise formed on the outer end of the cutting blade shaft 64 and is also rotated thereby in response to rotation of the driver shaft 34.

In accordance with the construction thus far shown and described, it can be seen that as the basket 20 is abutted against the undersurface of the ceiling 11, and the power tool 32 is energized, drive shaft 34 will rotate within the position compensating mechanism 50, as hereinafter described, and cause rotation of the coupling 60. However, the basket 20 is not rotatable thereby. Nevertheless, rotation of the drive shaft 34 and the cutting blade shaft 64 will cause rotation of the cutting blade 78 and the pilot drill 80. As this occurs, a hole will be cut in a ceiling.

The position compensating mechanism 50, as hereinafter described, will allow the cutting blade 78 an the pilot drill 80 to advance upwardly in the ceiling and also maintain the upper edge of the basket 20 in contact with undersurface of the ceiling. In this way, debris will be fully collected within the basket. Further, there will be no disruption of the seal between the upper surface of the basket and the undersurface of the ceiling, as shown in FIG. 1, when the cutting blade 78 and the pilot drill 80 proceed further upwardly into the ceiling structures.

The position compensating mechanism 50 is more fully illustrated in FIGS. 6 and 7 of the drawings. The compensating mechanism comprises the aforesaid housing 52, which in this case is preferably a tubular housing having an interior compartment or chamber 90. Located within the chamber 90 is a position compensating spring 92 which bears against a pair of spring guides 94 and all of which are disposed about the drive shaft 34 as shown in FIGS. 6 and 7. The guides 94 are provided with enlarged circular flanges 96 in order to receive the ends of the spring 92 and capture the spring 92 therebetween.

A collar 98 is also disposed about the drive shaft 34 and bears against the lowermost guide 94, that is, the right-hand end guide 94 as shown in FIG. 7 and the lower guide in FIG. 6 of the drawings when the compensating mechanism is vertically arrange in a normal position. The collar 98 actually can serve as a bearing. Otherwise, a suitable ring bearing may be provided in place of the collar 98. Finally a snap ring 100 is secured against the collar or bearing 98 as shown. The tubular housing 52 is closed at its outer end by an end plate 102 which is secured thereto by means of screws 104 as also best shown in FIGS. 6 and 7 of the drawings.

The clamping plate or collar 56 is provided with recess 105 for receiving the upper end of the position compensating mechanism housing 52, as best shown in FIG. 6. Moreover, at the upper end of the housing 52 and located in abutting engagement against the undersurface of the bottom plate 24 is a bearing 108 and which functions as an upper bearing when the position compensating mechanism is oriented in a vertical arrangement, this is, a normal arrangement of use. This bearing 108 along with the lower bearing 98 provided for journaling of the drive shaft 34. The bearings 106 and 108 are preferably SEARLE bearings.

An O-ring 109 is also disposed about the drive 34 and bears against the bearings 108. The O-ring 109 effectively functions as a sealing ring and prevents any debris collected in the basket 20 from entering into the chamber of the position compensating mechanism 50. Furthermore, a washer 112 and snap ring 114 are concentrically disposed about the drive shaft 34.

The housing 52 of the position compensating mechanism may also be formed of suitable plastic material, including any of the plastic materials identified above. However, and in more preferred construction, the housing 52 is preferably formed of a lightweight metal such as aluminum.

In accordance with the above-identified construction, it can be seen that as the drill 80 and the cutting blade 78 progress inwardly into the ceiling, that is, raise upwardly with respect to the ceiling, compensation of the position of the basket 20 must take place otherwise the basket would preclude raising of the blade 78 and the pilot drill 80. the position compensating mechanism provides for this positioning compensation. As the cutting blade 78 and drill 80 move upwardly, the basket 20 is effectively shifted downwardly an this will, in turn, cause a compression of the spring 92. However, the spring 92 will nevertheless create a biasing force against the mounting plates 56 and 58 and hence against the basket 20 biasing same upwardly into contact with the ceiling.

Figure 8:
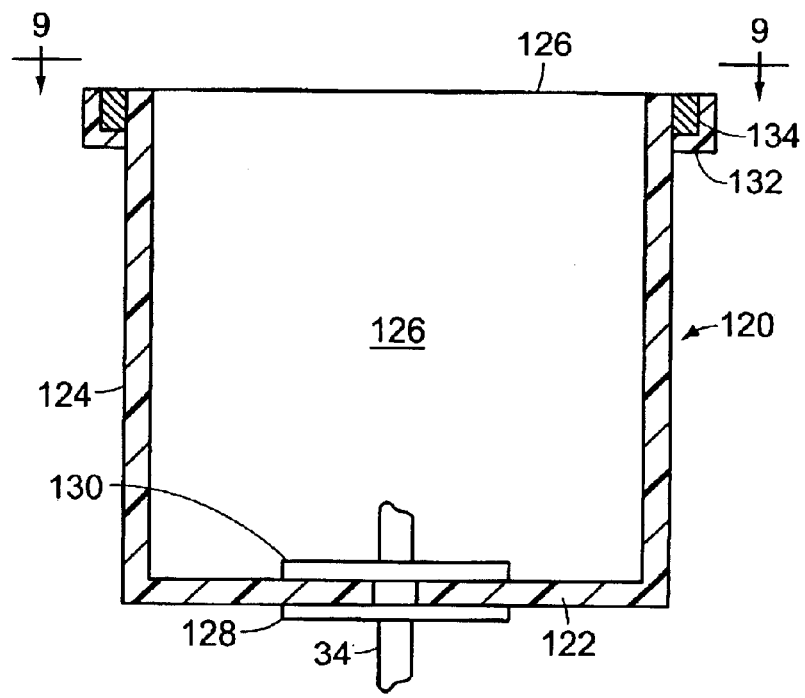
FIG. 8 is a vertical sectional view of a modified form of basket forming part of the debris collecting apparatus of the present invention.
Figure 9:
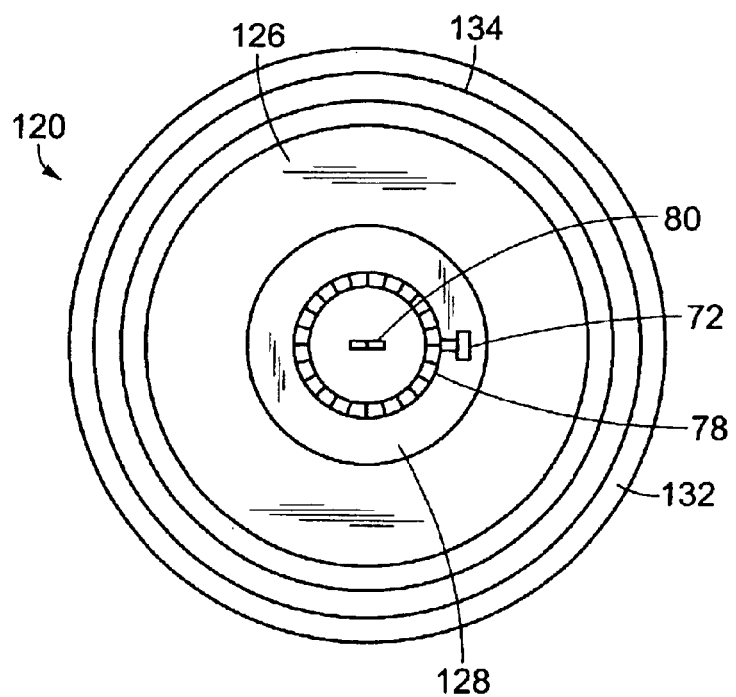
FIG. 9 is a top plan view taken substantially along the plane of line 9—9 of FIG. 8.

FIGS. 8 and 9 illustrate a modified form of basket 120 which may be used with the debris collecting apparatus of the present invention. The basket 120 is similarly provided with the bottom wall 122 and a continuous connecting side wall 124 with an open upper end 126. Furthermore, the basket 120 is held on the drive shaft 34 by means of mounting plates 128 and 130, as also shown in FIG. 8.

A channel 132 is formed around the upper end of the side wall 124 as also shown in FIGS. 8 and 9 and a urethane foam seal strip 134 is included within this channel 132. Beyond this, the remaining portions of the apparatus are substantially identical to those previously described.

Thus there has been illustrated and described a unique and novel debris collecting apparatus for use with ceiling cutting apparatus which allows a hole to be cut in a ceiling, while the collecting apparatus remains in contact with the ceiling throughout the cut. The present invention thereby fulfils all of the object and advantages which have been sought. It should be understood that many changes, modifications, variations and other issues of applications will become apparent to those skilled in the art after considering this specification and the accompanying drawings. Therefore, any and all such changes, modifications, variations and other uses and applications which do not depart from the spirit and scope of the invention are deemed to be a part of the present invention.

What is claimed is:

1. A debris collecting apparatus for use with a power tool having a rotatable drive shaft extending outwardly therefrom to collect debris resulting from a cutting of an opening in a ceiling, said apparatus comprising:

A) a basket, having an open upper end, and sized to receive debris from cutting of an opening in ceiling a ceiling when the open upper end engages the ceiling;

B) a lower opening in said basket to receive said rotatable drive shaft and allow its rotation independently of said basket;

C) coupling means provided for mounting on the upper end of said drive shaft and permitting attachment of a cutting blade thereto; and position compensating means which allows the cutting blade to extend upwardly into the ceiling during a cutting operation and which permits axial shifting movement of the basket relative to the drive shaft and cutting blade so that the basket remains in contact with the ceiling during said cutting operation, the position compensating mechanism having an outer housing and spring means in said housing which biases the basket upwardly with respect to the cutting blade but allows said basket to be pushed downwardly relative to the cutting blade as the cutting blade cuts upwardly into a ceiling, the position compensating mechanism further having a pair of bearing means associated with said position compensating mechanism which allows said shaft to extend rotatably through said position compensation mechanism outer housing allowing the housing to remain in a non-rotating condition with respect to the basket, said bearing mechanism includes one bearing means located adjacent one end of said housing in said housing, another bearing means is located adjacent on an opposite end of said housing, and flange plates, each flange plate located adjacent position to one of said bearing means for holding said spring means in a fixed position in said housing.

2. The debris collecting apparatus as recited in claim 1, wherein the basket has a bottom wall, a cylindrical side wall extending upward from the bottom wall to an open end having a peripheral edge, and a sealing ring extending on the peripheral edge of the open end of said side wall.

3. An assembly for cutting a portion of a ceiling without scatter of any debris therefrom, said assembly comprising:

A) powered drive means;

B) a drive shaft extending outwardly from said powered drive means and being driven thereby, a cutting blade attached to the drive shaft;

C) a debris collecting basket mounted on said drive shaft and having an opening which is upwardly presented when the drive shaft is vertically arranged in a cutting operation;

D) Means on an upper end of said basket for engaging the ceiling when said assembly is used in a cutting operation which enables an effective sealing against the ceiling to thereby collect any debris resulting from the cutting operation; and E) A position compensating means allowing said basket to be shifted axially relative to said drive shaft as a cutting blade in said drive shaft cuts into ceiling, the position compensating means has an outer housing, a compression spring located in said housing and which biases said basket into contact with said ceiling and biases the cutting blade downward, and a bearing mechanism including one bearing means located adjacent one end of said housing, another bearing means located adjacent an opposite end of said housing, and a pair of flange plates, each located adjacent to one of said bearing means to hold said compression spring in a fixed position in said housing while allowing the shaft to extend rotatably through said outer housing of said position compensating mechanism while allowing the housing to remain in a non-rotating condition.

4. The assembly as recited in claim 3, further comprising a pilot drill extending axially with respect to said drive shaft and projects concentrically through said cutting blade and is also rotated with said cutting blade.

5. The assembly as recited in clam 4, further comprising an arbor mounted on said shaft wherein said cutting blade is selectively mounted in said arbor.

* * * * *